United States Patent
Matthaus et al.

[15] 3,657,467
[45] Apr. 18, 1972

[54] COOLABLE ELECTRIC CABLE

[72] Inventors: Gunther Matthaus; Fritz Schmidt, both of Erlangen, Germany

[73] Assignee: Siemens Aktiengesellschaft, Berlin and Munich, Germany

[22] Filed: July 8, 1970

[21] Appl. No.: 53,229

[30] Foreign Application Priority Data

July 25, 1969 Germany..............P 19 37 796.9

[52] U.S. Cl..............174/15 C, 174/DIG. 6, 174/28, 174/126 CP, 335/216
[51] Int. Cl....................................H01b 7/34
[58] Field of Search............174/5 C, 15 C, 16, 16 B, 35, 174/36, 99, 126; 335/216; 138/113, 114

[56] References Cited

UNITED STATES PATENTS

| | | |
|---|---|---|
| 3,409,731 | 11/1968 | Fink et al..............174/15 |
| 3,512,581 | 5/1970 | Lawton..............174/15 X |
| 3,528,071 | 9/1970 | Kafka..............174/15 |

*Primary Examiner*—Laramie E. Askin
*Assistant Examiner*—A. T. Grimley
*Attorney*—Curt M. Avery, Arthur E. Wilfond, Herbert L. Lerner and Daniel J. Tick

[57] ABSTRACT

A coolable cable such as a cooled superconductive cable or the like has one or more electric conductors and includes a conduit concentric therewith for directing a coolant therealong. A plurality of tubes are provided in parallel spaced relation to the electric conductor and a metal band is wound around the tubes and forms a radiation shield. Supporting members are disposed intermediate the conductor and the tubes at respective positions along the longitudinal cable axis for supporting the tubes and the metal band.

10 Claims, 5 Drawing Figures

Patented April 18, 1972 3,657,467
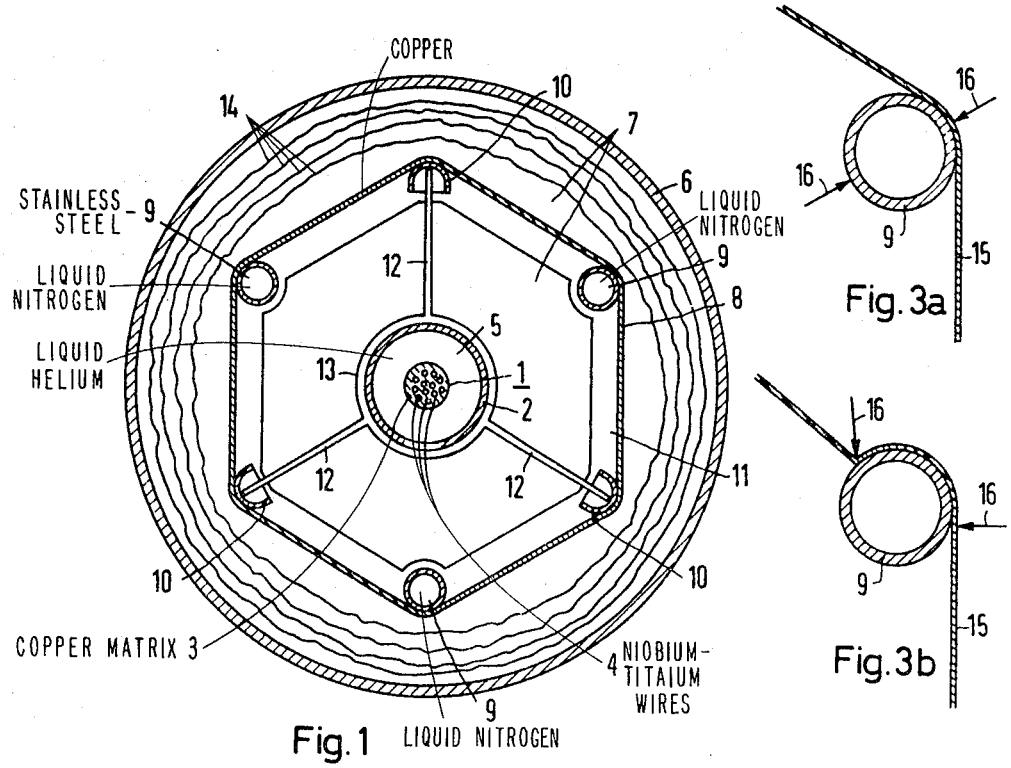
Fig. 1
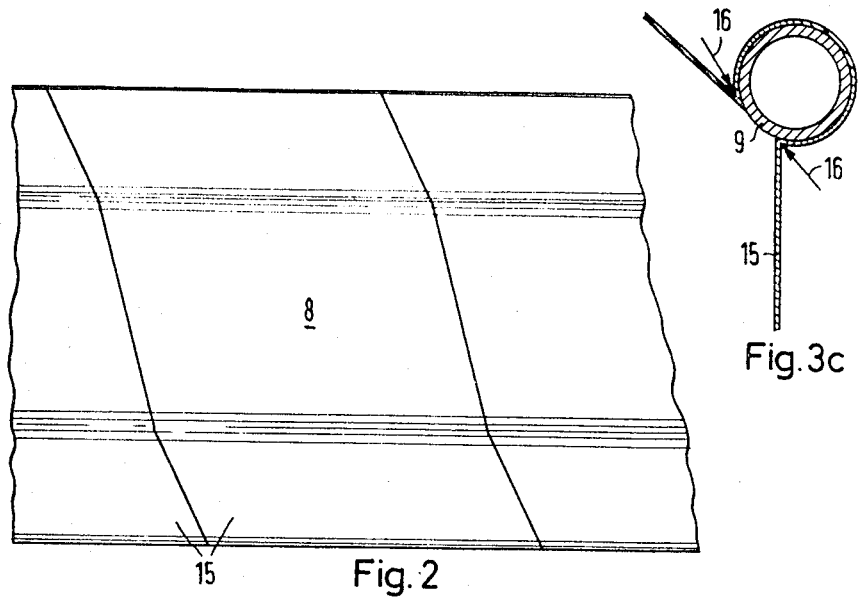
Fig. 2
Fig. 3a
Fig. 3b
Fig. 3c

COOLABLE ELECTRIC CABLE

Our invention relates to a cooled, preferably superconducting cable having a radiation shield of metal surrounding the electrical conductor or conductors coolable by means of a first cooling means. The shield is joined to several tubes which serve to direct a second cooling means.

Considerable advantages are obtainable from superconducting cables in the transmission of large amounts of electrical energy. For these cables, electrically normal conducting metals of especially high purity can be used as electrical conductors such as highly pure aluminum. Since the ohmic resistance of normal conducting metals is substantially smaller at low temperature than at room temperature, the electrical losses in the cable can be greatly reduced by cooling the conductors. Especially suitable for this type of cable are superconducting metals whose ohmic resistance completely disappears with cooling to a temperature beneath the critical or transition temperature of the superconducting material used. In this connection, as superconducting materials, the metals niobium and lead as well as the so-called high-field superconductive materials are especially to be considered. Examples of high-field superconductive materials are superconducting alloys of niobium and titanium or of niobium and zirconium, if necessary, these alloys are provided with additions of further materials. Another example which can be mentioned are intermetallic compounds of niobium-tin ($Nb_3Sn$). The superconductors can be joined in good electrically conductive and good heat conductive relation to metals such as copper or aluminum for electrical stabilization, these metals being connected electrically in parallel with the superconductors and being electrically normal conducting at the operating temperature of the superconductor. Or, the superconductors can be imbedded in these electrically normal conductive metals.

To cool conductors of electrically normal conducting metal, fluids especially suited are those having a boiling temperature of under approximately 150° K such as liquid hydrogen, liquid nitrogen or natural gas or cold gases of corresponding temperatures. For cooling superconductors, with the superconductive materials available at the present time, practically only liquid or cold helium in the gaseous state can be considered.

To keep the cooling capacity needed to cool the conductors to the smallest amount possible and to prevent unnecessary losses of cooling medium, the conductors and the cooling medium for cooling the conductors must be thermally insulated with respect to the exterior region of the cable. As a rule, this thermal insulation consists of an evacuated space surrounding the conductors. A reduction of the heat radiation impinging upon the conductors from the region surrounding the cable can be achieved by providing a radiation shield of sheet metal surrounding the conductors and cooled by means of a second cooling means having a temperature higher than the cooling means for cooling the conductors. According to a paper of E. C. Rogers and D. R. Edwards in the journal "Electrical Review" 181 (1967), p. 348 to 351, with superconducting cables cooled with liquid helium, this radiation shield consists of a sheet metal tube joined with several tubes.

The foregoing type of radiation shields of sheet metal have several disadvantages. For example, they must be preassembled before the cable is layed and transported to the location where the cable is to be layed. This can contribute significantly to the transport difficulties because of the relatively large diameter of the tubular or pipe-like radiation shield. In addition, because of the various movements of the conductors of the cable and the pipe-like radiation shield associated with a reduction of temperature to different levels, provisions must be made to cancel out the different changes in length. For this purpose, for example, expansion bellows can be required between individual parts of the pipe-like radiation shield.

It is an object of our invention to provide a cooled cable which overcomes the aforementioned difficulties associated with coolable cables.

More particularly, it is an object of our invention to provide a cooled, preferably superconducting cable having a radiation shield that has a simplified construction and improved operating characteristics.

According to a feature of the invention, the radiation shield comprises a metal band wrapped around tubes serving to direct the second cooling means and, if required, around additional supporting members.

Such a metal band can be moved to the location whereat the cable is to be layed without transporting difficulties. In addition, practically no difficulties are encountered because of a pulling together of the radiation shield with cooling because the metal band can be wound somewhat loose, so that it tenses with a shrinkage caused by cooling and because, in addition, the individual windings of the metal band can displace somewhat against each other in a direction along the longitudinal axis of the cable.

Materials suitable for the metal band are preferably good heat conductive metals such as copper or aluminum. Because of cost considerations the likewise suitable metals of gold and silver are not practical. The mentioned metals have a high reflectivity in the infra-red region decisive for the impinging heat radiation. Since the emission of infra-red radiation of a body is the same as the absorbtion thereof, the higher the reflectivity, the more effective is the operation of the radiation shield. This arrangement affords the special advantage that the metal bands can be produced with considerably better surface qualities than metal tubes, that is, with a smoother surface, and that the reflectivity of the radiation shield made of a metal band is therefore greater and the emission capability for infra-red radiation is smaller than with a radiation shield made of sheet metal. Stainless steel is a material useable for the metal band.

As additional supporting members for the radiation shield, it is advantageous to provide tube-shaped channels supported by spoke-like supports of poor heat conductive material braced against a pipe surrounding the electric conductor or conductors. The channels are advantageously joined to the tubes serving to carry the second cooling means with metal bridging members. The bridging members can be constructed so that they form a ring joining the channels with the tubes serving to guide or direct the second cooling means. In this manner, with respect to the electrical conductor or conductors, an especially stabile holder of good heat isolating material is provided for the radiation shield. The spoke-like supports are preferably slidably borne in the channels. With such a bearing arrangement, the channels can slidably move with respect to the spoke-like supports in the direction of the longitudinal cable axis, so that the different contractions of the radiation shield and the tube surrounding the conductors occurring with cooling can cancel.

In order to obtain the best possible thermal contact between the metal band and the tubes serving to direct the second cooling means, the metal band is advantageously pressed onto the tubes with cylinders or rollers, or is squeezed with the tubes when the radiation shield is formed. The surfaces of the tubes and the band are intermeshed with each other as a result of the squeezing action. For further improving the thermal contact, the band can also be welded with the tubes for directing the second cooling means.

The invention will now be described with reference to the accompanying drawing wherein:

FIG. 1 is a schematic diagram, in section, of a cooled cable of the invention provided with a radiation shield.

FIG. 2 is a side view of the radiation shield of the cable of FIG. 1.

FIGS. 3a to 3c illustrate several arrangements of welding the metal band of the radiation shield with the tubes serving to direct or guide the second cooling means.

Referring to the cooled cable of FIG. 1, the electrical conductor 1 is arranged within a pipe or conduit 2 made, for example, of stainless steel and serving to direct the first cooling means. The conductor 1 can be, for example, a copper matrix 3 in which a plurality of superconductive niobium-titanium wires 4 can be embedded. To cool conductor 1, liquid helium can be used which during the operation of the cable streams through the interior space 5 of pipe 2. The pipe 2 is surrounded by another vacuum tight pipe 6 which can likewise be made of stainless steel. The free space 7 between the two pipes 2 and 6 is evacuated to thermally insulate the cooled conductor 1 from the surrounding environment of the cable. Within this space 7, a radiation shield 8 comprising a copper band is provided. The copper band is wound about three tubes 9 and three additional tubular channels 10, the channels 10 serving as supporting members. The tubes 9 consist, for example, of stainless steel. The tubes 9 serve to direct the second cooling means for cooling the radiation shield. During operation of the cable, liquid nitrogen, for example, streams through the tubes 9. The tubular channels 10 which serve as supporting members, can be advantageously made of a poor heat conductive plastic or of ceramic. The tubes 9 and the channels 10 are positioned with respect to each other by means of metal rings to which they are admitted. One such ring 11 is illustrated in FIG. 1 and other such rings are disposed at positions along the longitudinal axis of the cable. The ring 11 can be constructed so as to be separable into parts, so that during the assembly of the cable, the rings 11 do not have to be slid onto the pipe 2. Instead, the rings 11 can be placed about the pipe 2 at their respective locations along the cable. Spoke-like supports 12 of poor heat conductive material, for example plastic or ceramic, are slidably borne by the tubular channels 10. The spoke-like supports 12 are braced against the pipe 2 and are held in place on this pipe by ring 13 made of poor heat-conductive material. The rings 13 can, for example, be constructed so as to consist of separable parts. Additional spoke-like supports 12 and rings 13 of the aforementioned types are disposed at positions along the longitudinal axis of the cable. The supports 12 and rings 13 are preferably spatially displaced toward the metal ring 11, so that a sliding of the spoke-like supports 12 in the tubular channels 10 is not prevented by the ring 11. Channels 10 made of plastic or ceramic afford the advantage that between the radiation shield 8 and the pipe 2 only a small amount of heat passes. In addition, these materials make it possible for the spoke-like support elements to slide easily. For an additional improvement in the heat insulation, layers of poor heat-conductive foils 14 can be provided intermediate the radiation shield 8 and the pipe 6. Especially suitable for this purpose are layers of polyethyleneterephtalate foils which are preferably coated with reflecting aluminum.

FIG. 2 is a side view of the radiation shield of the cable of FIG. 1 and illustrates how the copper band 15 forms the radiation shield with overlapping edges. If desired, several bands can be wound a plurality of turns next to each other.

In FIGS. 3a to 3c are illustrated several possibilities as to how the copper band 15 can be welded to the tubes 9 serving to direct the second cooling means. It is preferable to form the welded joint between band 15 and tubes 9 by means of resistance welding wherewith the welding electrodes are disposed at the locations designated by the arrows 16. The welding procedure is advantageously combined with the winding procedure, so that the finished winding of the band 15 which forms the radiation shield is joined with the tubes 9 by means of a continuous seam weld running in the direction of the longitudinal axis of these tubes.

With other forms of the cable, in the place of the conductor 1 illustrated in FIG. 1, a tubular conductor can be used having an outer surface coated with a layer of superconductive material. Also, the pipe 2 can, for example, be coated with a layer of superconductive material on its inner surface, the layer serving to conduct the current. Also, within the pipe 2, several conductors could be disposed instead of the one conductor 1. The conductor 1 could be made of aluminum for example in a cooled normal conducting cable. As a cooling means for the conductor, liquid hydrogen can be used for example.

Also the support of the radiation shield 8 can be modified in many ways. Especially the number of tubes 9 serving to direct the second cooling means and the number of tubular channels 10 can be varied. At the place of the metal ring 11 between the tubes 9 and the channels 10, bridge-like struts can be arranged. In addition, the channels 10 can consist of metal if the spoke-like supports 12 are sufficiently heat resistant.

To those skilled in the art it will be obvious upon a study of this disclosure that our invention permits of various modifications and may be given embodiments other than particularly illustrated herein, without departing from the essential features of the invention and within the scope of the claims annexed hereto.

We claim:

1. A coolable cable comprising electrical conductor means which includes a conduit concentric therewith for directing a cyrogenic coolant therealong, a plurality of tubes disposed in parallel spaced relation to said conductor means for directing the flow of a second cyrogenic coolant, a metal band wound about said tubes and forming a radiation shield and support means disposed intermediate said conductor means and said tubes for supporting the latter and said metal band.

2. In a cable according to claim 1, said band consisting of a metal selected from the group consisting of copper and aluminum.

3. A cable according to claim 1 wherein said conductor means comprises at least one electrical conductor disposed within said conduit, and wherein said support means has tubular channels disposed in parallel spaced relation with respect to said conduit, and spoke-like members of poor heat conductive material disposed intermediate said conduit and said channels for bracing the latter with respect to the former.

4. A cable according to claim 3 wherein said channels each have bridging members connected between the mutually adjacent channels thereof for supporting said plurality of tubes relative to said channels.

5. In a cable according to claim 4, said bridging members forming a ring holding channels and said tubes in place.

6. In a cable according to claim 5, the spokes of said spoke-like members each having an end slidably mounted in a corresponding one of said channels.

7. In a cable according to claim 1, said metal band being press joined to said plurality of tubes.

8. In a cable according to claim 1, said metal band being clamp joined to said plurality of tubes.

9. In a cable according to claim 1, said metal band being welded to said plurality of tubes.

10. A cable according to claim 1, said electrical conductor means comprising at least one electrical conductor disposed within said conduit, said conductor exhibiting superconductive characteristics when said first-mentioned cyrogenic coolant is at a temperature below the critical temperature corresponding to said conductor.

* * * * *